United States Patent [19]

Dwyer

[11] Patent Number: 4,769,155

[45] Date of Patent: Sep. 6, 1988

[54] TURBIDITY REDUCTION

[75] Inventor: Michael L. Dwyer, Joliet, Ill.

[73] Assignee: Nalco Chemical Company, Naperville, Ill.

[21] Appl. No.: 87,557

[22] Filed: Aug. 19, 1987

[51] Int. Cl.$^4$ ............................................. C02F 1/56
[52] U.S. Cl. ..................................... 210/728; 210/735; 252/181
[58] Field of Search ............... 210/609, 702, 725, 727, 210/728, 735; 252/181

[56] References Cited

U.S. PATENT DOCUMENTS

| | | | |
|---|---|---|---|
| 3,412,019 | 11/1968 | Hoover et al. | 210/734 |
| 3,953,330 | 4/1976 | Tonkyn et al. | 210/736 |
| 3,994,806 | 11/1976 | Rausch et al. | 210/728 |
| 4,108,768 | 8/1978 | Sebelik et al. | 210/725 |
| 4,308,149 | 12/1981 | Selvarajan | 210/736 |
| 4,450,992 | 5/1984 | Huang | 252/181 |

FOREIGN PATENT DOCUMENTS

| | | | |
|---|---|---|---|
| 56-28612 | 3/1981 | Japan | 210/728 |
| 56-76293 | 6/1981 | Japan | 210/728 |
| 59-92100 | 5/1984 | Japan | 210/728 |

*Primary Examiner*—Peter Hruskoci
*Attorney, Agent, or Firm*—John G. Premo; Anthony L. Cupoli; Donald G. Epple

[57] ABSTRACT

A process for reducing turbidity in turbid waters which comprises adding to said waters a composition consisting essentially of an aqueous solution of:
 (a) calcium chloride and
 (b) a water soluble organic positively charged polymeric coagulant having an average molecular weight of at least 2000 selected from the group consisting of polydiallyl dimethylammonium chloride polymer and dimethylamine epichlorohydrin ethylenediamine the weight of (a) to (b) being within the range of 0.75:1 to 4:1.

3 Claims, No Drawings

TURBIDITY REDUCTION

BACKGROUND OF THE INVENTION

It is well known in the art to clarify raw turbid waters containing kaolin or other finely divided suspended solids with various inorganic compounds and water soluble organic positively charged polymeric coagulants which are used independently of one another. In general, for high turbidity waters containing, for example 200 parts per million (ppm) kaolin, such organic coagulants are effective in reducing turbidity. In low turbidity waters, for example, those containing 20 ppm kaolin, the organic coagulants alone are not as effective. Cost effectiveness is also a problem in water clarification.

U.S. Pat. No. 4,450,092 teaches the use of polydiallyl dimethylammonium chloride polymer or dimethylamine epichlorohydrin ethylene diamine polymer used in conjunction with either aluminum chloride, aluminum sulfate, ferric chloride, or ferric sulfate. This combination of polymeric coagulant having an average molecular weight of at least 2000 and inorganic water soluble salt specified above has been shown to be useful for coagulating finely divided solids in turbid water.

It is desirable to provide a new and improved products which is effective in clarifying water and at the same time are cost effective.

BRIEF SUMMARY OF THE INVENTION

In accordance with the invention compositions are provided which are useful for coagulating finely divided solids in turbid waters. These are prepared by mixing or blending together with calcium chloride a water soluble organic positively charged polymeric coagulant such as polydiallyl dimethylammonium chloride polymer or dimethylamine epichlorohydrin-ethylenediamine polymer. The compositions are especially useful for treating low turbidity waters, for example, waters having a turbidity of less than 20 NTU (nephelometric turbidity units). More particularly, these compositions are useful for reducing the heavy metal (Zn, Pb, Cr, Mn) of water.

These compositions provide a dosing advantage over the compositions of the U.S. Pat. No. 4,450,092.

DETAILED DESCRIPTION OF THE INVENTION

Calcium chloride is available commercially as a solid and can be dissolved in water to form an aqueous solution.

Usually, for the purpose of the invention, it is preferable to employ the inorganic component of the composition as an 18-40% by weight aqueous solution, preferably 18-25% by weight.

The preferred high molecular weight polydiallyl dimethylammonium chloride polymer has an intrinsic viscosity of 0.8 and a molecular weight of approximately 100,000. The preferred dimethylamine epichlorohydrin-ethylenediamine polymer is available commercially as a 47% by weight polymer in aqueous solution. The high molecular weight polydiallyl dimethylammonium chloride polymer is available commercially as a 20% by weight polymer in aqueous solution. These polymers are positively charged. Other polymers of a similar type with intrinsic viscosities usually within the range of 0.08 to 1.0 can be employed for the practice of the invention.

Since the compositions employed for the purpose of the invention are used in very small dosages measured in terms of parts per million (ppm) of the water being treated, it is desirable from the standpoint of application to prepare the compositions in the form of aqueous solutions. In preparing these solutions it is preferable to prepare the inorganic component separately as a aqueous solution having 18-25% by weight solids concentration, although the solids concentration may go as high as 40% by weight, and to mix or blend this solution and the water soluble organic positively charged polymeric coagulant component, which has also been previously dissolved or occurs commercially, in aqueous solution.

In general, the weight ratio of the inorganic component of the compositions prepared in accordance with the invention and utilized to clarify turbid waters is within the range of 0.75:1 to about 4:1 and the water present in the solutions containing said components will vary from about 30% by weight to about 57% by weight.

For turbidity removal a pH greater than 5 is desired. To maximize heavy metal ion removal a pH greater than 8 is desired.

EXAMPLES

The invention will be further illustrated but is not limited by the following example in which the quantities are by weight unless otherwise indicated.

The following Tables provide Product Compositions used, Jar Test results using those compositions or water from an actual existing automotive plant, and Influent, Effluent and Sludge cake analyses from an actual automotive plant.

The standard jar test described in *The Nalco Water Handbook*, 808 to 822, McGraw Hill Book Company, 1979 was used. A 500 ml sample of turbid water was dosed at 100 rpm. The clarity at 3 minutes was noted.

TABLE I

| | | PRODUCT COMPOSITION |
|---|---|---|
| A | 15 wt % | Dimethylamine epichlorohydrin-ethylene diamine polymer |
| | 85 wt % | Aluminum Chloride Solution (23 wt % AlCl$_3$) |
| B | 19.2 wt % | CaCl$_2$ |
| | 20.0 wt % | Polydiallyl dimethylammonium chloride polymer, iv = 0.12–0.18; Mw = 50,000; 20 wt % polymer |
| | 60.8 wt % | Naperville Tap Water (NTW) |
| C | 19.2 wt % | CaCl$_2$ |
| | 20.0 wt % | Polydiallyl dimethylammonium chloride polymer, iv = 0.25; Mw = 50,000; 20 wt % polymer |
| | 60.8 wt % | NTW |
| D | 19.2 wt % | CaCl$_2$ |
| | 20.8 wt % | Dimethylamine epichlorohydrin-ethylene diamine polymer, iv = 0.12–0.18; Mw = 50,000; 47 wt % polymer |
| | 60.8 wt % | NTW |
| E | 19.2 wt % | CaCl$_2$ |
| | 20.3 wt % | Dimethylamine epichlorohydrin-ethylene diamine polymer, iv = 0.08; Mw = 20,000 50 wt % polymer |
| | 60.8 wt % | NTW |
| F | 5.0 wt % | Dimethylamine epichlorohydrin-ethylene diamine polymer, iv = 0.25; Mw = 50,000; 20 wt % polymer |
| | 95.0 wt % | Ferric Chloride Solution (14.1% FeCl$_3$) |

TABLE II

Jar Testing Results
For the Product Compositions

| Product | Dosage (PPM) | Clarity |
|---|---|---|
| 10% Lime | 150 | Good |
| A | 50 | Good |
| B | 25 | Good |
| C | 50 | Good |
| D | 50 | Good |
| E | No Activity | Hazy |
| F | 50 | Good |

TABLE III

Influent A
WATER ANALYSIS

| CATIONS: | *FILTERABLE* PPM | TOTAL PPM |
|---|---|---|
| Calcium (CaCO3) | 380. | 720. |
| Magnesium (CaCO3) | 56. | 850. |
| Sodium (CaCO3) | 1600. | 1600. |
| Nickel (Ni) | 0.3 | 47. |
| Potassium (K) | 27. | 27. |
| Cadmium (Cd) | | 0.02 |
| Chromium (Cr) | | 29. |
| Copper (Cu) | | 0.39 |
| Iron (Fe) | 0.06 | 34. |
| Manganese (Mn) | | 0.44 |
| Strontium (Sr) | 0.19 | 0.34 |
| Titanium (Ti) | | 0.23 |
| Zinc (Zn) | 0.01 | 11. |
| Aluminum (Al) | | 2.0 |
| Lead (Pb) | 0.05 | 0.05 |
| ANIONS: | PPM | PPM |
| Boron (B) | 5.9 | |
| Phosphorus (P) | 1.7 | 54. |
| Silica (SiO2) | 36. | |
| Sulfur (S) | 180. | 180. |
| OTHERS: | PPM | PPM |
| Total Suspended Solids at 105 C. | | 1600. |

*Passes through a 0.45 micron filter*
The following elements were 0.1 ppm:
Ba  Mo  Sb
The following elements were 0.01 ppm:
Co  V  Zr

TABLE IV

Effluent A
WATER ANALYSIS

| CATIONS | *FILTERABLE* PPM | TOTAL PPM |
|---|---|---|
| Calcium (CaCO3) | 340. | 340. |
| Magnesium (CaCO3) | 68. | 72. |
| Sodium (CaCO3) | 1200. | 1200. |
| Barium (Ba) | 0.4 | 0.4 |
| Nickel (Ni) | 0.3 | 0.7 |
| Potassium (K) | 31. | 31. |
| Chromium (Cr) | 0.5 | 0.29 |
| Copper (Cu) | 0.02 | 0.02 |
| Iron (Fe) | 0.10 | 0.39 |
| Strontium (Sr) | 0.19 | 0.20 |
| Titanium (Ti) | | 0.03 |
| Vanadium (V) | 0.01 | 0.01 |
| Zinc (Zn) | 0.01 | 0.01 |
| Zirconium (Zr) | 0.01 | 0.01 |
| Aluminum (Al) | | 0.1 |
| Lead (Pb) | 0.05 | 0.05 |
| ANIONS: | PPM | PPM |
| Boron (B) | 6.7 | |
| Phosphorus (P) | 1.8 | 2.2 |
| Silica (SiO2) | 46. | |
| OTHERS: | PPM | PPM |
| Total Suspended Solids at 105 C. | | |

*Passes through a 0.45 micron filter*
The following elements were 0.1 ppm:
Mo  Sb The following elements were 0.01 ppm:
Cd  Co  Mn

TABLE V

Sludge Cake for A
ASH ANALYSIS
(WEIGHT PERCENT OF ASH)

| | |
|---|---|
| Magnesium (MgO) | 35 |
| Calcium (CaO) | 17 |
| Silicon (SiO2) | 14 |
| Phosphorus (P2O5) | 10 |
| Chromium (Cr2O3) | 8 |
| Nickel (NiO) | 5 |
| Iron (Fe2O3) | 4 |
| Sulfur (SO3) | 3 |
| Sodium (Na2O) | 1 |
| Zinc (ZnO) | 1 |
| Loss at 800 C. (%) | 37.4 |
| Loss at 105 C. (%) | 63.8 |

Elements Not Detected in the Ash:
Al  Cl  K  Ti  V  Mn  Co  Cu  Sr
Mo  Sn  Ba  Pb

TABLE VI

Influent B
WATER ANALYSIS

| CATIONS | *FILTERABLE* PPM | TOTAL PPM |
|---|---|---|
| Calcium (CaCO3) | 120. | 150. |
| Magnesium (CaCO3) | 110. | 150. |
| Sodium (CaCO3) | 780. | 780. |
| Nickel (Ni) | 6.1 | 45. |
| Potassium (K) | 29. | 29. |
| Cadmium (Cd) | | 0.01 |
| Chromium (Cr) | 0.02 | 33. |
| Copper (Cu) | | 0.28 |
| Iron (Fe) | 0.02 | 9.3 |
| Manganese (Mn) | 0.01 | 0.15 |
| Strontium (Sr) | 0.15 | 0.21 |
| Titanium (Ti) | | 0.08 |
| Zinc (Zn) | 0.04 | 3.7 |
| Aluminum (Al) | | 0.4 |
| Lead (Pb) | 0.05 | 0.05 |
| ANIONS: | PPM | PPM |
| Boron (B) | 7.3 | |
| Phosphorus (P) | 6.9 | 27. |
| Silica (SiO2) | 44. | |
| Sulfur (S) | 170. | 170. |
| OTHERS: | PPM | PPM |
| Total Suspended Solids at 105 C. | | 410. |

*Passes through a 0.45 micron filter*
The following elements were 0.1 ppm:
Ba  Mo  Sb
The following elements were 0.01 ppm:
COo  V  Zr

TABLE VII

EFFLUENT B
WATER ANALYSIS

| CATIONS: | *FILTERABLE* PPM | TOTAL PPM |
|---|---|---|
| Calcium (CaCO3) | 130. | 140. |
| Magnesium (CaCO3) | 70. | 73. |
| Sodium (CaCO3) | 1100. | 1100. |
| Barium (Ba) | 0.1 | 0.1 |
| Nickel (Ni) | 0.3 | 0.4 |
| Potassium (K) | 19. | 19. |
| Chromium (Cr) | 0.05 | 0.14 |
| Copper (Cu) | 0.01 | 0.02 |
| Iron (Fe) | 0.06 | 0.12 |

TABLE VII-continued
EFFLUENT B
WATER ANALYSIS

| | | |
|---|---|---|
| Strontium (Sr) | 0.14 | 0.15 |
| Titanium (Ti) | | 0.03 |
| Zinc (Zn) | 0.05 | 0.05 |
| Zirconium (Zr) | | 0.01 |
| Aluminum (Al) | | 0.01 |
| Lead (Pb) | 0.05 | 0.05 |
| ANIONS: | PPM | PPM |
| Boron (B) | 8.0 | |
| Phosphorus (P) | 2.0 | 2.4 |
| Silica (SiO2) | 36. | |
| OTHERS: | PPM | PPM |
| Total Suspended Solids at 105 C. | | 5. |

*Passes through a 0.45 micron filter*
The following elements were 0.1 ppm:
Mo   Sb
The following elements were 0.01 ppm:
Cd   Co   Mn   V

TABLE VIII
Sludge Case For B
ASH ANALYSIS
(WEIGHT PERCENT OF ASH)

| | |
|---|---|
| Chromium (Cr2O3) | 24 |
| Magnesium (MgO) | 18 |
| Phosphorus (P2O5) | 13 |
| Nickel (NiO) | 13 |
| Silicon (SiO2) | 12 |
| Calcium (CaO) | 10 |
| Iron (Fe2O3) | 4 |
| Sulfur (SO3) | 2 |
| Sodium (Na2O) | 1 |
| Zinc (ZnO) | 1 |
| Loss at 800 C. (%) | 40.4 |
| Loss at 105 C. (%) | 65.1 |

Elements Not Detected In The Ash:
Al   Cl   K   Ti   V   Mn   Co   Cu   Sr
Mo   Sn   Ba   Pb While the blends produced in accordance with the invention are useful in reducing water turbidity levels in both high turbidity water and low turbidity water they are especially useful in low turbidity water clarification applications in which most organic coagulants do not reduce water turbidity levels to the desired range. In the past, alum and other inorganic coagulants have been used for this type of application. However, the alum sludge and other inorganic sludges are often too bulky and too fine for handling. Blends of the inorganic and organic coagulants alleviate this problem.

As shown by the data, these compositions significantly reduce the amount of the heavy metal found in the water to be clarified. A reduction of greater than 50% is achieveable.

The invention is hereby claimed as follows:

1. A process for reducing turbidity in turbid waters which comprises adding to said waters in an amount sufficient to reduce the turbidity of said waters a composition consisting essentially of an aqueous solution blend of (a) about 18–40% by weight aqueous solution of calcium chloride and, (b) a water soluble organic positively charged polymeric coagulant having an average molecular weight of at least about 50,000 and an average intrinsic viscosity of at least about 0.12 of a polydiallyl dimethylammonium chloride polymer dissolved in water, the weight ratio of (a) to (b) being within the range of 0.75:1 to 4:1, and clarifying said turbid waters by reducing said turbidity.

2. A process as claimed in claim 1 in which the turbidity of said waters does not exceed 200 ppm and the quantity of said composition added to said waters is sufficient to reduce turbidity at least to 10 NTU.

3. A process as claimed in claim 1 in which said turbid waters have a low turbidity of not more than 20 ppm of suspended solids and the quantity of said composition added to said waters is sufficient to reduce the turbidity until the NTU is not more than 5.

* * * * *